April 11, 1967     O. L. SWEDBURG     3,313,367

AIR CUSHION DEVICE WITH SERIES RESONATOR CHAMBER

Filed April 23, 1965

INVENTOR.
Orvin L. Swedburg
BY
W. F. Wegner
ATTORNEY

United States Patent Office 3,313,367
Patented Apr. 11, 1967

3,313,367
AIR CUSHION DEVICE WITH SERIES
RESONATOR CHAMBER
Orvin L. Swedburg, Santa Barbara, Calif., assignor to General Motors Corporation, Detroit, Mich., a corporation of Delaware
Filed Apr. 23, 1965, Ser. No. 450,453
4 Claims. (Cl. 180—7)

This invention relates to load supporting devices capable of establishing and maintaining substantially frictionless relation with a surface, and more particularly to devices of the type supported relative to the surface by means of a low pressure free air cushion.

The present invention is directed to improvements in air cushion devices of the type disclosed in copending application Ser. No. 4,465, Harry A. Mackie et al., and since abandoned, entitled, "Air Cushion Vehicle," and assigned to General Motors Corporation. In the indicated application, there is disclosed a modified plenum chamber type air cushion device comprising a generally horizontally extending flexible membrane which is attached centrally and peripherally to a load supporting platform so as to form a depending perimetrical convolution which surrounds a central plenum cavity.

An object of the present invention is to provide an improved air cushion device.

Another object is to provide a device of the general type described which is susceptible to rapid assembly and disassembly, and in which the component parts are easily and economically fabricated.

Still another object is to provide a device of the stated character which incorporates a resonator chamber coactive with the air cushion device to increase the latter's resistance to low frequency hop.

A further object is to provide a structure of the general type described in which each of the component parts coacts with the others to provide a self-retaining assembled structure.

Figure 1:
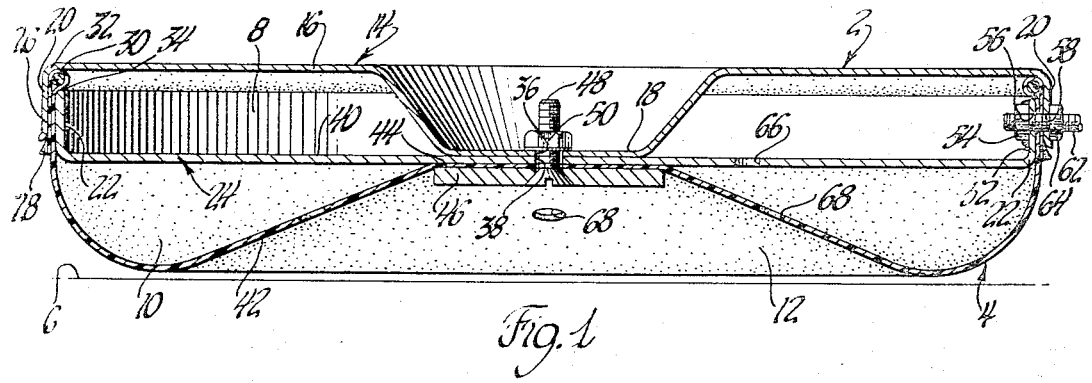
Figure 2:
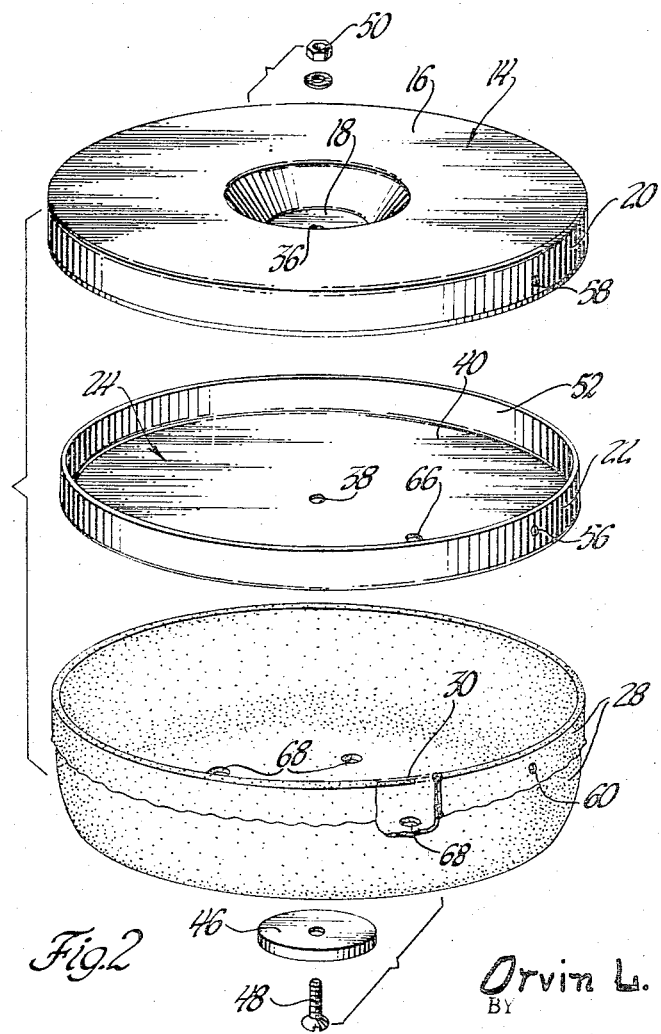

These and other objects, advantages and features of the invention will become more readily apparent as reference is had to the accompanying specification and drawing wherein:

FIGURE 1 is a sectional elevational view of the device in accordance with the invention; and FIGURE 2 is an exploded perspective view of the device shown in FIGURE 1.

Referring now to the drawings and particularly FIGURE 1, there is shown a self-modulating flexible choke air cushion device in which the reference numeral 2 generally designates a load supporting platform which is disposed above and connected to a generally horizontal flexible membrane 4 lying in proximate relation to a ground surface 6. In accordance with the general features of the invention, the platform 2 is in the form of an annular rigid hollow body providing an interior resonator chamber 8 arranged in series fluid communication between a source of fluid pressure, not shown, and an annular chamber 10 formed between platform 2 and membrane 4, which in turn is in series communication with a plenum chamber 12 formed between membrane 4 and the ground 6.

According to another feature of the invention, the separate component parts making up the combined resonator chamber and air cushion device are so constructed and arranged that when in assembled relation each coacts with the other to provide a self-retaining unitary structure. As seen best in FIGURE 1, platform 2 comprises an upper thin walled circular shell 14 having a top wall 16, a depressed center wall 18, and a downturned cylindrical margin or rim 20 which surrounds the upturned cylindrical margin or rim 22 of a cooperating lower thin walled circular shell 24. Rims 20 and 22 are dimensioned so that in assembled relation an annular recess 26 is formed therebetween which receives the outer cylindrical wall portion 28 of flexible membrane 4. Wall portion 28 is re-entrantly folded around a circumferential bead 30 which abuts the radius juncture 32 of wall 16 and rim 20 and overlies the top edge 34 of rim 22. Centrally thereof, depressed center wall 18 is formed with an aperture 36 which is aligned with a corresponding aperture 38 formed centrally in the bottom wall 40 of shell 24. The level of depressed center wall 18 is dimensioned vertically relative to top wall 16 so that when drawn into abutting engagement with the central portion of the bottom wall 40 of lower shell 24, in a manner shortly to be described, the top wall 16 of shell 14 and top edge 34 of rim 22 exerts compressive loading on bead 30 effective to securely retain the re-entrantly folded cylindrical wall portion 28 of membrane 4 in recess 26.

Centrally thereof, membrane 4 is dished upwardly to form a generally conoidal intermediate portion 42 and an apex portion 44 which is sandwiched between a retainer plate 46 and the lower surface of shell 24 and secured to platform 2 by a bolt 48 passing through apertures 36 and 38 and engaging a nut 50. In addition to securing retainer plate 46, bolt 48 and nut 50 function to simultaneously secure depression 18 in abutting relation with shell 24. It will thus be seen that all of the interlocking relationships between the component parts are maintained by the single center retainer bolt 48 and nut 50. Consequently, the device is not only easily assembled initially, but in addition may also be disassembled for repair, inspection or component replacement, with great ease.

In order to supply the device with flow of air under pressure in accordance with the invention, the inner peripheral surface 52 of rim 22 has secured thereto a threaded nut or fitting 54 arranged in alignment with an aperture 56 extending through the rim. A second radially aligned aperture 58 is formed in rim 20. Similarly, the two layers of membrane wall 28 are pierced to provide an opening 60 aligned with apertures 56 and 58. A threaded nipple 62 extends through both apertures 56 and 58, as well as membrane opening 60, and threadably engages nut 54, while a nut 64 threadably carried on nipple 62 is subsequently tightened until the nipple is securely retained in position. It will be understood that the outboard end of nipple 62 is connected in any suitable manner to a source of air pressure, not shown.

As previously mentioned, shells 14 and 24 cooperate to provide a resonator chamber which coacts with the annular chamber 10 formed between membrane 4 and shell 24 and the plenum chamber 12 formed between membrane 4 and the ground surface 6. To this end, the bottom wall 40 is formed with an aperture 66 which permits restricted flow of air from chamber 8 into chamber 10, while the intermediate wall portion 42 of membrane 4 is formed with a plurality of apertures 68 providing substantially unrestricted communication between chambers 10 and 12. In practice, it has been determined that when aperture 66 is properly proportioned relative to chamber 8 and the combined volume of chambers 10 and 12, the range of variation in air flow rate which the device will tolerate without exhibiting vertical oscillation or low frequency hop, is greatly extended.

A particularly valuable attribute of the construction, in terms of practical utilization, resides in the manner in which disassembly may be accomplished. Thus, when bolt 48 has been removed and the threaded nipple 62 withdrawn, separation of shells 14 and 20 and consequent disengagement of cylindrical wall portion 28 of membrane 4 is accomplished by physically displacing a portion of membrane 4 into abutting relation with aperture 66 and then introducing air under pressure into chamber 8 by means of a hose held in abutting engagement over aperture 58. This operation results in progressively increasing pressure in chamber 8 which forces the opposing shells apart and releases the outer cylindrical wall of membrane 4.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. An air cushion device comprising a pair of shell members having circular horizontal walls bounded by vertically oppositely extending cylindrical walls disposed in telescoped relation forming a fixed cross section resonator chamber vertically therebetween and an annular recess radially therebetween, a preformed flexible membrane having a dished lower wall portion secured centrally thereof to one of said member and an outer cylindrical wall portion disposed in said recess and re-entrantly folded about a circumferential bead, said bead having a cross sectional diameter greater than the radial dimension of said recess, means for introducing air under pressure into said fixed cross section chamber, means providing restricted communication between said fixed cross section chamber and said variable cross section chamber, and means forming a plurality of apertures in said membrane adjacent the center thereof.

2. An air cushion device comprising a pair of shell members having circular horizontal walls bounded by vertically oppositely extending cylindrical walls disposed in telescoped relation forming a fixed cross section resonator chamber vertically therebetween and an annular recess radially therebetween, one of said shell members being formed with a depressed central portion abutting the central portion of the other shell member and including releasable means for securing said abutting portions together, a preformed flexible membrane having a dished lower wall portion secured centrally thereof to one of said member and an outer cylindrical wall portion disposed in said recess and re-entrantly folded about a circumferential bead to form a variable cross section chamber therebetween, said bead having a cross section diameter greater than the radial dimension of said recess, means for introducing air under pressure into said fixed cross section chamber, means providing restricted communication between said fixed cross section chamber and said variable cross section chamber, and means forming a plurality of apertures in said membrane adjacent the center thereof.

3. The structure set forth in claim 2 including means associated with said releasable means operative to effect securement of said dished lower wall portion to said one of said members.

4. The structure set forth in claim 3 wherein said bead is compressively loaded between the cylindrical wall of one of said member and the horizontal wall of the other of said members when said central portions are in abutting relation.

References Cited by the Examiner
UNITED STATES PATENTS

| | | | |
|---|---|---|---|
| 3,082,836 | 3/1963 | Billman | 180—7 |
| 3,096,728 | 7/1963 | Omann et al. | 180—7 X |
| 3,161,247 | 12/1964 | Mackie | 180—7 |
| 3,164,103 | 1/1965 | Lathers et al. | 180—7 X |
| 3,174,573 | 3/1965 | Chaplin | 180—7 |
| 3,200,898 | 8/1965 | Dobbertien | 180—7 |

FOREIGN PATENTS 924,834  5/1963  Great Britain.

A. HARRY LEVY, *Primary Examiner.*

UNITED STATES PATENT OFFICE
CERTIFICATE OF CORRECTION

Patent No. 3,313,367                                         April 11, 1967

Orvin L. Swedburg

It is hereby certified that error appears in the above numbered patent requiring correction and that the said Letters Patent should read as corrected below.

Column 1, line 48, for "drawings" read -- drawing --; column 3, line 21, and column 4, lines 4 and 21, for "member", each occurrence, read -- members --; column 4, line 29, for "Omann et al." read -- Amann et al. --.

Signed and sealed this 14th day of November 1967.

(SEAL)
Attest:

Edward M. Fletcher, Jr.

Attesting Officer

EDWARD J. BRENNER

Commissioner of Patents